United States Patent
Chiang

(10) Patent No.: US 7,111,312 B2
(45) Date of Patent: Sep. 19, 2006

(54) RADIAL VIBRATION DETECTION APPARATUS

(75) Inventor: Pi-Cheng Chiang, Taipei (TW)

(73) Assignee: Lite-On It Corporation, Taipei (TW)

( * ) Notice: Subject to any disclaimer, the term of this patent is extended or adjusted under 35 U.S.C. 154(b) by 553 days.

(21) Appl. No.: 10/645,076

(22) Filed: Aug. 21, 2003

(65) Prior Publication Data

US 2004/0141443 A1  Jul. 22, 2004

(30) Foreign Application Priority Data

Jan. 17, 2003  (TW) .............................. 92200905 U

(51) Int. Cl.
*G11B 19/20*  (2006.01)

(52) U.S. Cl. ..................... 720/712; 720/707

(58) Field of Classification Search ............... 720/604, 720/605, 698, 707, 716, 717, 721, 722, 723, 720/724

See application file for complete search history.

(56) References Cited

U.S. PATENT DOCUMENTS

| | | | | |
|---|---|---|---|---|
| 4,692,915 A | * | 9/1987 | Moriya et al. ........... | 369/53.18 |
| 5,438,564 A | * | 8/1995 | Takahashi ................... | 720/722 |
| 5,963,517 A | * | 10/1999 | Nakagaki et al. ........ | 369/53.18 |
| 6,038,206 A | * | 3/2000 | Mukawa ..................... | 720/707 |
| 6,111,826 A | * | 8/2000 | Minase ..................... | 369/53.18 |
| 6,785,208 B1 | * | 8/2004 | Fujimoto et al. ........ | 369/53.18 |
| 6,829,777 B1 | * | 12/2004 | Tokumitsu .................. | 720/717 |
| 6,912,184 B1 | * | 6/2005 | Lim et al. ................ | 369/53.18 |
| 6,993,826 B1 | * | 2/2006 | Takahashi et al. ....... | 29/603.12 |

FOREIGN PATENT DOCUMENTS

JP  2003168285 A  *  6/2003

\* cited by examiner

*Primary Examiner*—Thang V. Tran
*Assistant Examiner*—Nathan Danielsen
(74) *Attorney, Agent, or Firm*—Thomas, Kayden, Horstemeyer & Risley

(57) ABSTRACT

A radial vibration detection apparatus for detecting the radial vibration value of an optical assembly of an optical disc drive. The radial vibration detection apparatus includes a cover, a magnet, a plurality of clamping structures and a base. The cover has a cover body, a plurality of engaging elements and a circumferential flange. The engaging elements are disposed on the lower surface of the cover body in an equiangular manner. The circumferential flange is formed on the cover body. The cover body has a magnet accommodating portion formed on the center thereof. The magnet is disposed in the magnet accommodating portion. The clamping structures are disposed in the engaging elements, respectively. The base is disposed under the cover and has a bottom, a circumferential wall and a second positioning element. The second positioning element is disposed on the circumferential wall to engage the first positioning element of the cover.

10 Claims, 6 Drawing Sheets

RADIAL VIBRATION DETECTION APPARATUS

BACKGROUND OF THE INVENTION

1. Field of the Invention

The present invention relates to a radial vibration detection apparatus, and in particular to a radial vibration detection apparatus that detects the radial vibration value of an optical assembly of an optical disc drive during optical assembly operation.

2. Description of the Related Art

Generally speaking, an optical disc drive includes an optical pick-up, a spindle motor, and a turntable, among other components. In order to rapidly and continuously access data in an optical disc during optical disc drive operation, the optical disc has to rotate at a high speed. When the optical disc rotates with the spindle motor, axial and radial vibration usually occurs, thereby causing focus and tracking errors in the optical pick-up on the optical disc.

Axial and radial vibration occurs due to several factors. For example, a bearing is not accurately assembled on the spindle motor, and the turntable for loading the optical disc is not correctly fitted in the bearing. Nevertheless, the design and manufacture of the bearing is enhanced. Thus, the axial and radial vibration is caused mainly by the assembly between the bearing and spindle motor or between the bearing and turntable rather than by the bearing itself.

Referring to FIG. 1, an optical assembly 5 includes a turntable 6 and a spindle motor 7. The turntable 6 is disposed on the spindle motor 7. The spindle motor 7 has a bearing (not shown) and is electrically connected to a circuit board 51. The turntable 6 has a body 61, a first part 61a and a second part 61b. An iron accommodating portion 62 is formed on the first part 61a of the body 61, and an iron element 63 is disposed therein. Additionally, five resilient clamp elements 64 are formed on the first part 61a and near the iron accommodating portion 62. The resilient clamp elements 64 protrude from the first part 61a and extend to the second part 61b in an equiangular manner. Thus, the body 61 is equally divided into five portions. The central hole of the optical disc is fitted onto the five clamp elements 64, and the optical disc is held thereby.

Usually, the turntable 6 is assembled on the spindle motor 7 by means of a punching process after the spindle motor 7 has been manufactured. At this time, assembling deviation is generated to enlarge the radial vibration, thereby causing manufacturing failure of the optical disc drive. In order to decrease or avoid the manufacturing failure of the optical disc drive, a detection device or process is needed on the production line. Specifically, the five resilient clamp elements 64 of the turntable 6 increase difficulty in detecting the radial vibration. Thus, a coordinate measurement machine or roundness measurement instrument is needed to detect the radial vibration. Nevertheless, the coordinate measurement machine or roundness measurement instrument is very expensive and the operation thereof is very complicated. Thus, detection of the radial vibration in the optical assembly 5 is inconvenient.

Hence, there is a need to provide a radial vibration detection apparatus to overcome the aforementioned problems. The radial vibration value of the turntable can be quickly and accurately detected on the production line. Meanwhile, the operation of the radial vibration detection apparatus is easy, such that defective optical assemblies are easily detected.

SUMMARY OF THE INVENTION

Accordingly, an object of the invention is to provide a radial vibration detection apparatus for detecting the radial vibration value of an optical assembly of an optical disc drive. The optical assembly has a turntable. The turntable has a first part and a second part connected thereto. The first part has an iron element and a plurality of clamp elements extended to the second part. The radial vibration detection apparatus comprises a cover, a magnet, a plurality of clamping structures and a base. The cover has a cover body, a plurality of engaging elements and a circumferential flange. The engaging elements are disposed on the lower surface of the cover body in an equiangular manner. The circumferential flange is formed on the cover body. The cover body has a magnet accommodating portion formed on the center thereof. A first positioning element is disposed on the circumferential flange, and each of the engaging elements has a first sloped surface and a through hole. The magnet is disposed in the magnet accommodating portion. The clamping structures slide and are disposed in the through holes of the engaging elements, respectively. The base is disposed under the cover and has a bottom, a circumferential wall and a second positioning element. The circumferential wall is upwardly formed on the bottom. The second positioning element is disposed on the circumferential wall to engage the first positioning element disposed on the circumferential flange of the cover. The bottom is formed with a fitting hole and a plurality of through grooves. The fitting hole is formed on the center of the bottom and accommodates the turntable. The through grooves are formed on the bottom in a radial and equiangular manner and correspond to the clamp elements of the turntable.

Preferably, each clamping structure further comprises a linking shaft, a retardant element and a retaining element. The linking shaft is fitted in the through hole of each engaging element. The retardant element and retaining element are connected to opposite ends of the linking shaft, respectively. The retardant element pushes against the second part of the turntable.

Preferably, the first positioning element is a through hole or column.

Preferably, the second positioning element is a through hole or column.

Preferably, the retardant element further comprises a second sloped surface matching the first sloped surface of each engaging element.

Preferably, the bottom of the base further comprises a plurality of spaced portions. The engaging elements are located on the spaced portions.

Preferably, the radial vibration detection apparatus further comprises a measuring tool placed on the outer surface of the circumferential wall of the base to detect the radial vibration value.

Preferably, the measuring tool is a probe.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
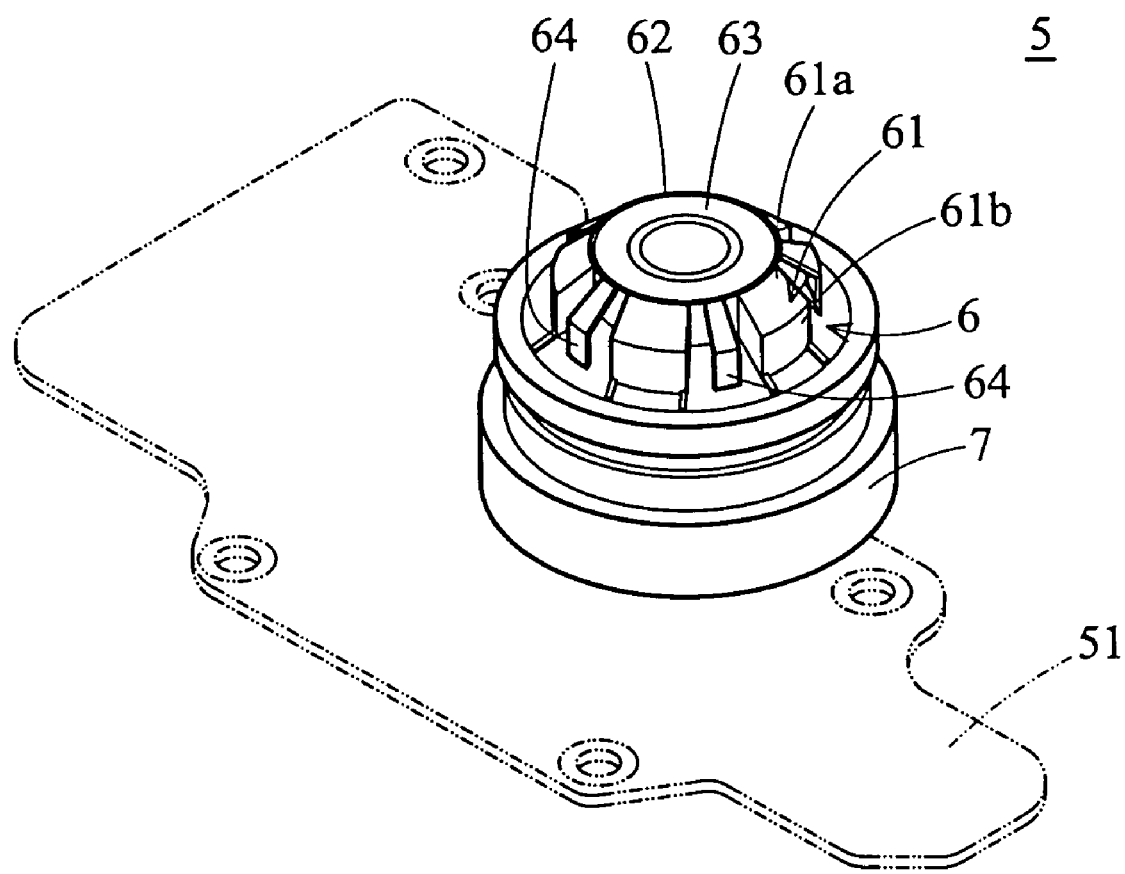
FIG. 1 is a perspective view showing an optical assembly of an optical disc drive.
Figure 2:
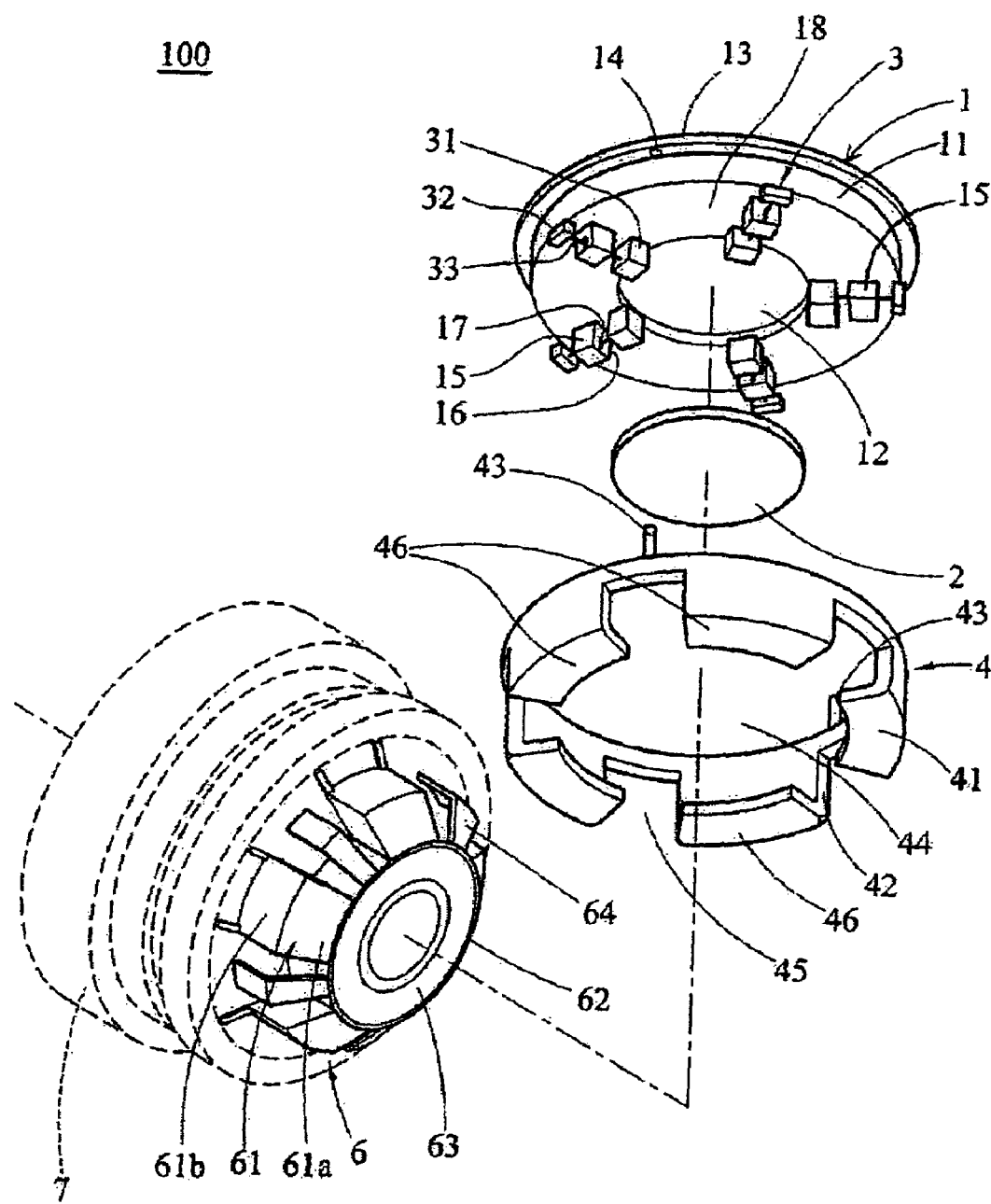
FIG. 2 is an exploded perspective view showing the radial vibration detection apparatus of the invention.

Referring to FIG. 2, the radial vibration detection apparatus 100 comprises a cover 1, a magnet 2, five clamping structures 3 and a base 4.

Figure 4A:
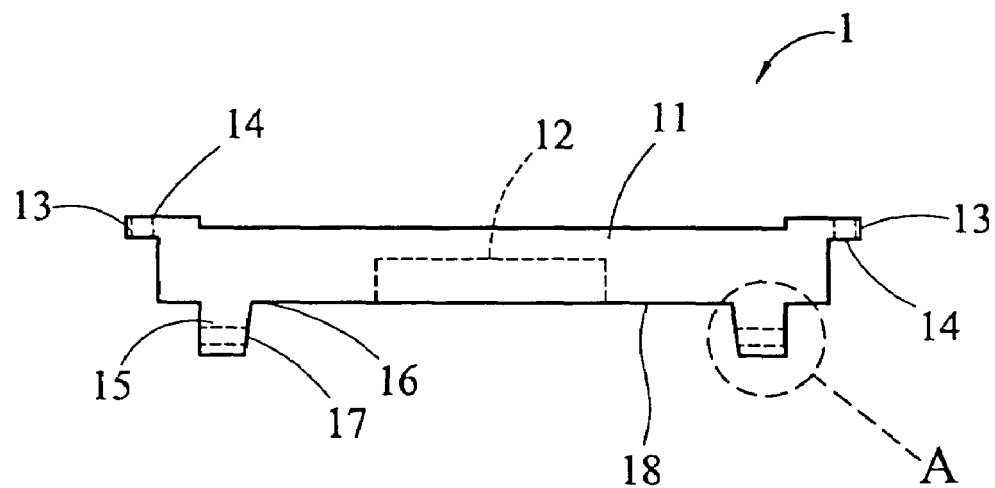
FIG. 4A is a side view of the cover according to FIG. 2.
Figure 4B:
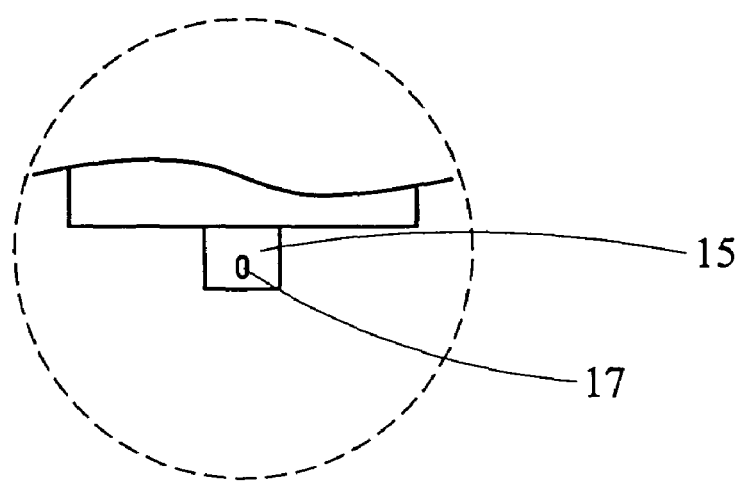
FIG. 4B is an enlarged view showing the A portion of FIG. 4A.
Figure 5:
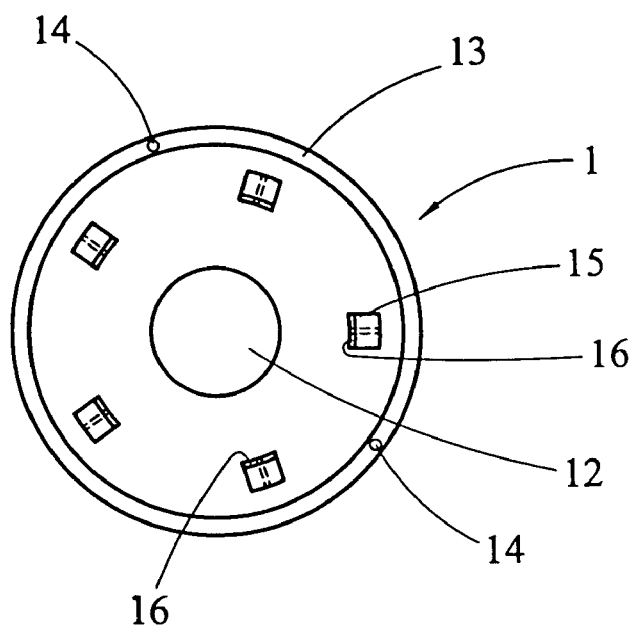
FIG. 5 is a bottom view of the cover according to FIG. 2.

As shown in FIG. 2, FIG. 4A and FIG. 5, the cover 1 has a cover body 11, five engaging elements 15 and a circumferential flange 13. The cover body 11 is circular. The engaging elements 15 are disposed on the lower surface 18 of the cover body 11 in an equiangular manner. The circumferential flange 13 is formed on the cover body 11. The center of the cover body 11 is formed with a magnet accommodating portion 12. Two first positioning elements 14 are disposed on the circumferential flange 13. Specifically, the first positioning elements 14 are through holes. In addition, each of the engaging elements 15 has a first sloped surface 16 and a through hole 17.

As shown in FIG. 2, the magnet 2 is disposed in the magnet accommodating portion 12.

Figure 6:
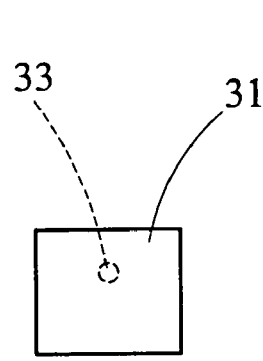
FIG. 6 is a front view showing the clamping structure according to FIG. 2.
Figure 7:
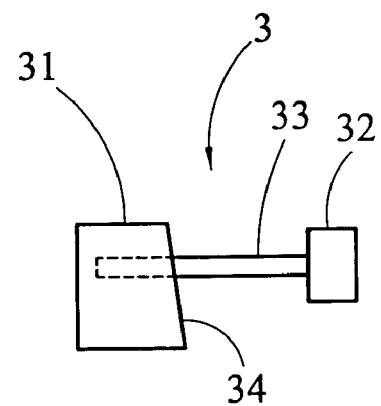
FIG. 7 is a side view showing the clamping structure according to FIG. 2.

As shown in FIG. 2, FIG. 6 and FIG. 7, the five clamping structures 3 slide and are disposed in the through holes 17 of the engaging elements 15, respectively. Additionally, each clamping structure 3 has a linking shaft 33, a retardant element 31 and a retaining element 32. The linking shaft 33 is fitted in the through hole 17 of each engaging element 15. The retardant element 31 and retaining element 32 are respectively connected to opposite ends of the linking shaft 33, as shown in FIG. 7. Moreover, the cross section of the through hole 17 is strip-shaped, such that each clamping structure 3 can slide along the first sloped surface 16 of each engaging element 15. Furthermore, the retardant element 31 has a second sloped surface 34. The second sloped surface 34 matches the first sloped surface 16 of each engaging element 15.

Figure 3:
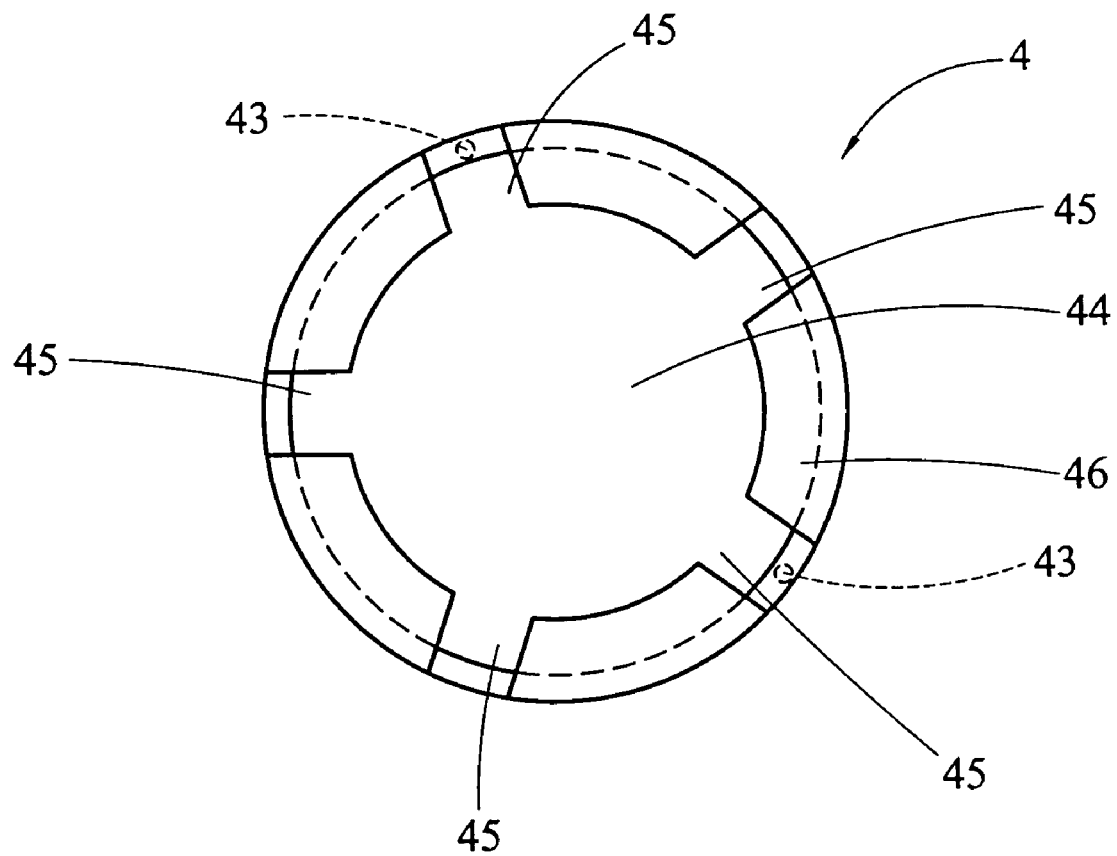
FIG. 3 is bottom view of the base according to FIG. 2.

As shown in FIG. 2 and FIG. 3, the base 4 is disposed under the cover 1 and has a bottom 41, a circumferential wall 42 and two second positioning elements 43. The circumferential wall 42 is upwardly formed on the bottom 41. Specifically, the second positioning elements 43 are columns and disposed on the circumferential wall 42. Additionally, the bottom 41 is formed with a fitting hole 44 and five through grooves 45. The fitting hole 44 is formed on the center of the bottom 41. The through grooves 45 are formed on the bottom 41 in a radial and equiangular manner and correspond to the clamp elements 64 of the turntable 6. Specifically, the through grooves 45 extend to the circumferential wall 42 from the bottom 41. Furthermore, the bottom 41 of the base 4 has five spaced portions 46. Namely, the five spaced portions 46 and five through grooves 45 are interposed.

The following description explains the detection of the radial vibration value of the optical assembly 5.

First, the optical assembly 5 is fixed on a detection platform (not shown). The base 4 is fitted on the turntable 6. The five clamp elements 64 are located in the five through grooves 45, respectively. Then, the cover 1 is fitted onto the base 4. Meanwhile, the second positioning elements 43 disposed on the circumferential wall 42 of the base 4 engage the first positioning elements 14 disposed on the circumferential flange 13 of the cover 1.

Accordingly, the engaging elements 15 of the cover 1 are located on the spaced portions 46 of the base 4. The engaging elements 15 in combination with the clamping structures 3 and the clamp elements 64 are interposed. Because the iron element 63 is disposed on the top of the turntable 6 and the magnet 2 is disposed on the bottom of the cover 1, the turntable 6 attracts the cover 1. At this time, the cover 1 is moved substantially downward and the retardant elements 31 of the clamping structures 3 are moved upward along the first sloped surfaces 16 of the engaging elements 15. Thus, the retardant elements 31 push against the second part 61b of body 61 of the turntable 6.

Figure 8:
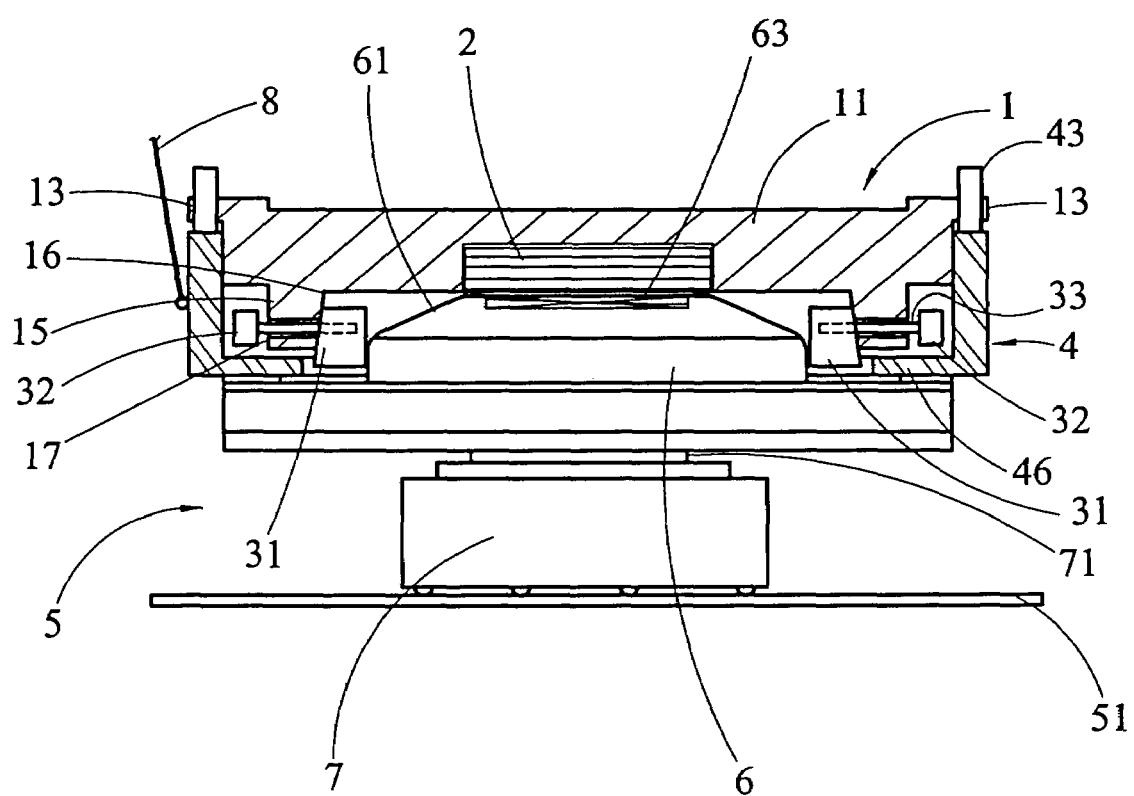
FIG. 8 is a cross section showing the radial vibration detection apparatus fitted on the optical assembly.

Referring to FIG. 8, a measuring tool 8, such as a probe, connected to an analyzing device (not shown) is placed on the outer surface of the circumferential wall 42 of the base 4. When the spindle motor 7 rotates, the body 61 of the turntable 6 is held by the five clamping structures 3 and the circumferential wall 42 of the base 4 sways due to the radial vibration of the turntable 6. Thus, the measuring tool 8 is pushed by the circumferential wall 42. Then, according to the displacement of the measuring tool 8, the analyzing device can determine the radial vibration value of the turntable 6.

In conclusion, the radial vibration detection apparatus 100 of the invention has the following advantages. The radial vibration of the turntable is quickly and accurately detected, such that manufacturing defects in the optical disc drive decrease. The operation of the radial vibration detection apparatus 100 is easy, and thereby reduces needed manpower and manufacturing costs.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A radial vibration detection apparatus for detecting the radial vibration value of an optical assembly of an optical disc drive, the optical assembly having a turntable, the turntable having a first part and a second part connected thereto, the first part having an iron element and a plurality of clamp elements extended to the second part, the radial vibration detection apparatus comprising:

a cover having a cover body, a plurality of engaging elements and a circumferential flange, the engaging elements disposed on the lower surface of the cover body in an equiangular manner, the circumferential flange is formed on the cover body, the cover body having a magnet accommodating portion formed on the center thereof, wherein a first positioning element is disposed on the circumferential flange, and each of the engaging elements has a first sloped surface and a through hole;

a magnet disposed in the magnet accommodating portion;

a plurality of clamping structures sliding and disposed in the through holes of the engaging elements, respectively; and a base disposed under the cover and having a bottom, a circumferential wall and a second positioning element, the circumferential wall upwardly formed on the bottom, the second positioning element disposed on the circumferential wall to engage the first positioning element disposed on the circumferential flange of the cover, wherein the bottom is formed with a fitting hole and a plurality of through grooves, the fitting hole formed on the center of the bottom and accommodating the turntable, and the through grooves formed on the bottom in a radial and equiangular manner and corresponding to the clamp elements of the turntable.

2. The radial vibration detection apparatus as claimed in claim 1, wherein each clamping structure further comprises a linking shaft, a retardant element and a retaining element, the linking shaft fitted in the through hole of each engaging element, the retardant element and retaining element connected to two opposite ends of the linking shaft, respectively, and the retardant element pushing against the second part of the turntable.

3. The radial vibration detection apparatus as claimed in claim 1, wherein the first positioning element is a through hole.

4. The radial vibration detection apparatus as claimed in claim 3, wherein the second positioning element is a column.

5. The radial vibration detection apparatus as claimed in claim 1, wherein the first positioning element is a column.

6. The radial vibration detection apparatus as claimed in claim 5, wherein the second positioning element is a through hole.

7. The radial vibration detection apparatus as claimed in claim 2, wherein the retardant element further comprises a second sloped surface matching the first sloped surface of each engaging element.

8. The radial vibration detection apparatus as claimed in claim 1, wherein the bottom of the base further comprises a plurality of spaced portions, the engaging elements located on the spaced portions.

9. The radial vibration detection apparatus as claimed in claim 1, further comprising a measuring tool placed on the outer surface of the circumferential wall of the base to detect the radial vibration value.

10. The radial vibration detection apparatus as claimed in claim 9, wherein the measuring tool is a probe.

* * * * *